(12) United States Patent
Hiesl et al.

(10) Patent No.: US 9,512,987 B2
(45) Date of Patent: Dec. 6, 2016

(54) LIGHTING DEVICE

(71) Applicant: Dr. Ing. h.c. F. Porsche Aktiengesellschaft, Stuttgart (DE)

(72) Inventors: Gerald Hiesl, Herrenberg-Oberjesingen (DE); Heinz Redlich, Vaihingen-Enz (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 108 days.

(21) Appl. No.: 14/093,549

(22) Filed: Dec. 2, 2013

(65) Prior Publication Data

US 2014/0160739 A1   Jun. 12, 2014

(30) Foreign Application Priority Data

Dec. 12, 2012   (DE) .......... 10 2012 112 145

(51) Int. Cl.
```
B60Q 1/26      (2006.01)
F21V 15/01     (2006.01)
F21K 99/00     (2016.01)
F21S 8/10      (2006.01)
```
(52) U.S. Cl.
CPC ............ *F21V 15/01* (2013.01); *B60Q 1/2607* (2013.01); *F21K 9/00* (2013.01); *F21S 48/215* (2013.01); *F21S 48/2212* (2013.01); *F21S 48/2237* (2013.01); *F21S 48/2243* (2013.01)

(58) Field of Classification Search
CPC ........................................ F21S 8/10
See application file for complete search history.

(56) References Cited

U.S. PATENT DOCUMENTS

| | | | |
|---|---|---|---|
| 5,765,940 A * | 6/1998 | Levy et al. | 362/240 |
| 6,280,480 B1 * | 8/2001 | Tuttle et al. | 362/518 |
| 6,837,602 B1 * | 1/2005 | Lee | 362/520 |
| 2002/0067548 A1 * | 6/2002 | TerHovhannisian | 359/627 |
| 2003/0179584 A1 * | 9/2003 | Pond et al. | 362/487 |
| 2006/0082987 A1 * | 4/2006 | Dorsey | F21S 48/215 362/103 |
| 2009/0052197 A1 * | 2/2009 | Peters et al. | 362/487 |
| 2011/0273899 A1 * | 11/2011 | Ota et al. | 362/518 |

FOREIGN PATENT DOCUMENTS

| | | | | |
|---|---|---|---|---|
| DE | 102004003979 A1 * | 8/2005 | .......... | B60Q 1/52 |
| DE | 102006035503 A1 * | 2/2008 | .......... | B60Q 1/26 |
| JP | 2001126510 A | 5/2001 | | |

* cited by examiner

*Primary Examiner* — Peggy Neils
*Assistant Examiner* — Alexander Garlen
(74) *Attorney, Agent, or Firm* — Leydig, Voit & Mayer, Ltd.

(57) ABSTRACT

A lighting device includes a housing, at least one cover panel covering the housing and a plurality of lighting elements disposed in the housing and forming different lighting units. Four of the lighting elements are arranged in a rectangular arrangement with respect to one another so as to form a first lighting unit. The four lighting elements of the first lighting unit including two upper lighting elements disposed adjacent to one another and two lower lighting elements disposed adjacent to one another.

14 Claims, 4 Drawing Sheets

LIGHTING DEVICE

CROSS REFERENCE TO RELATED APPLICATIONS

This application claims priority from German Patent Application No. DE 10 2012 112 145.1 filed Dec. 12, 2012, which is hereby incorporated by reference herein in its entirety.

FIELD

The invention relates to a lighting device, in particular for a motor vehicle.

BACKGROUND

Lighting devices for a motor vehicle are widespread in the prior art. Lighting devices for application as a rear light of the motor vehicle by means of a tail light, a brake light, a flashing indicator light, a reversing light and, if appropriate, a rear fog light are therefore known. In this context it is known to arrange the lights in a housing, wherein the cramped arrangement of such lights causes the respective size of the lights to become ever smaller.

SUMMARY

In an embodiment, the present invention provides a lighting device including a housing, at least one cover panel covering the housing and a plurality of lighting elements disposed in the housing and forming different lighting units. Four of the lighting elements are arranged in a rectangular arrangement with respect to one another so as to form a first lighting unit. The four lighting elements of the first lighting unit including two upper lighting elements disposed adjacent to one another and two lower lighting elements disposed adjacent to one another.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
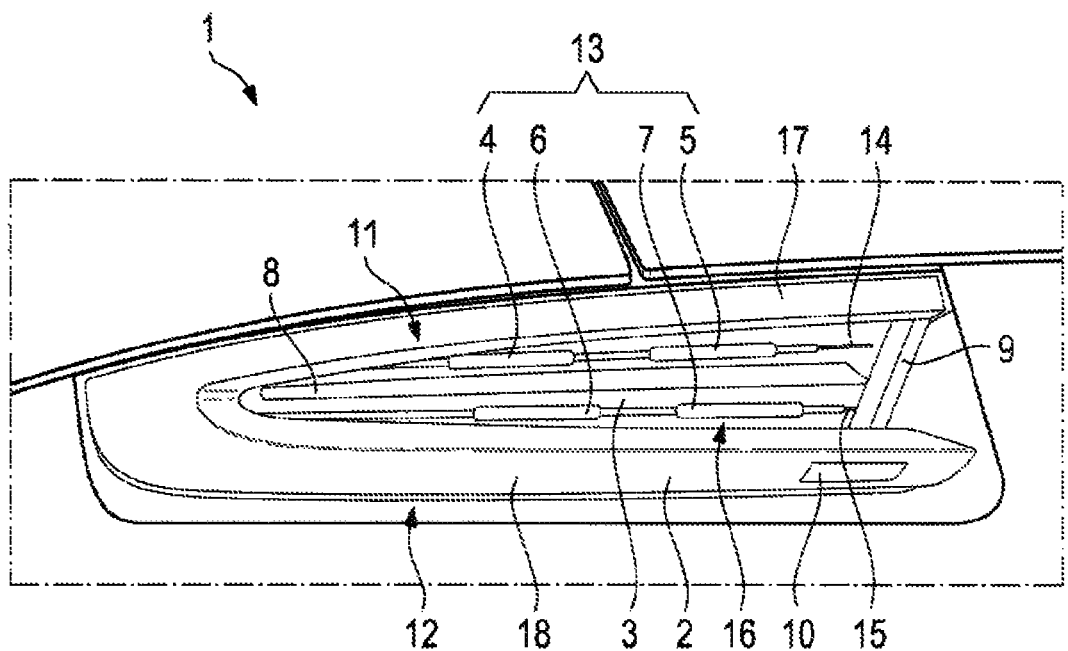
FIG. 1 shows a schematic illustration of a lighting device.

An aspect of the present invention is to provide a lighting device which is of simple design and nevertheless can be clearly recognized.

An embodiment of the invention relates to a lighting device having a housing and lighting elements which are arranged in the housing and have the purpose of forming different lighting units, wherein the housing is covered with at least one cover panel, characterized in that four lighting elements are arranged in a rectangular arrangement with respect to one another in order to form a lighting unit, having two upper lighting elements which are arranged adjacent to one another, and two lower lighting elements which are arranged adjacent to one another, and where in each case two of the lighting elements are connected to one another by means of a connecting web. As a result it is possible to ensure that the illuminated area which is defined by the rectangular arrangement of the four lighting elements is detected as such over a large area, which increases the recognizability.

It is particularly advantageous if the lighting elements are light emitting diodes. As a result, an energy-efficient configuration can be selected whose low installation space for the arrangement of the four lighting elements is advantageous. In this context, in each case two light emitting diodes can be arranged as lighting elements on a printed circuit board. Alternatively, all four light emitting diodes can be arranged on a printed circuit board.

It is also expedient if the connecting webs are oriented essentially horizontally or inclined with respect to the horizontal, and in each case a connecting web connects to one another two lighting elements which are arranged essentially horizontally at the same height or two lighting elements which are arranged offset in relation to one another with respect to the height. In this context, the connecting web can be an element which is connected to a printed circuit board and connects the light emitting diodes.

It is also expedient if a first connecting web connects two lighting elements which are arranged horizontally essentially at the same height as one another, and a second connecting web connects to one another two lighting elements which are arranged offset in relation to one another with respect to the height.

Alternatively it is advantageous if in each case a connecting web connects to one another two lighting elements which are arranged offset in relation to one another with respect to the height.

The connecting webs can be arranged essentially in a straight and essentially horizontal fashion or arranged in an inclined fashion. As an alternative to the straight embodiment, the connecting webs can also have a curvature.

It can also be expedient if the two connecting webs are connected to one another in an arcuate shape. In this respect, it may be expedient if the lighting elements and the connecting web are arranged on a common arcuate printed circuit board.

Furthermore, it is expedient if the connecting webs are embodied in an illuminated or illuminating or unilluminated form.

It is also expedient if at least one transversely extending linear second lighting element is arranged between the two upper and the two lower lighting elements. This has a favorable effect on the distribution area, wherein a linear lighting element can be implemented, for example, by means of a lightguide or by means of a series of light emitting diodes which is/are arranged between the arrangement of the light emitting diodes of the rectangular arrangement. As a result, a mounting unit can also be provided if the light emitting diodes in this regard are arranged as lighting elements on a printed circuit board which are installed with the printed circuit board or boards of the light emitting diodes of the rectangular arrangement.

It is also expedient if at least one transversely extending linear third lighting element is arranged between the two upper and the two lower lighting elements, said lighting element being arranged adjacent to the second lighting element.

The first lighting elements which are in a rectangle can advantageously be arranged as a brake light. Alternatively, these lighting elements can be embodied as a flashing indicator light or as a tail light with or without brake light.

The second and/or the third lighting element can be embodied here as a flashing indicator light or tail light and/or brake light.

It is also advantageous here if the housing has a frame-like enclosure which is embodied in the form of a C and extends transversely, wherein one arm is arranged above, and one arm is arranged below, the four lighting elements which are arranged in a rectangular arrangement with respect to one another.

Furthermore, it is advantageous if the frame-like enclosure projects with respect to a cover panel for covering the four lighting elements which are arranged in a rectangular arrangement with respect to one another.

In this context it is expedient if a cover panel is provided for covering the transversely extending linear second and/or third lighting elements, wherein this cover panel projects with respect to a cover panel for covering the four lighting elements which are arranged in a rectangular arrangement with respect to one another.

Furthermore, it is expedient if the frame-like enclosure is embodied in an illuminated or illuminating or unilluminated form.

FIG. 1 shows a lighting device 1 in an arrangement in a rear part of a motor vehicle. The lighting device 1 has a housing 2 in which a multiplicity of lighting elements are arranged in order to form different lighting units. In this context, for example a tail light, a flashing indicator light, a brake light, a rear fog light and/or a reversing light or some other type of light can be formed.

In the exemplary embodiment in FIG. 1, the housing 2 is covered with at least one cover panel 3 at the rear end region of the motor vehicle. The lighting elements 4, 5, 6, 7, 8, 9, 10, 11 are arranged distributed in the housing 2. Furthermore, the housing 2 has a frame-like enclosure 12 which, in the exemplary embodiment in FIG. 1, is also provided with lighting elements 11 and can be illuminated. Alternatively, the frame element can also be dispensed with or unilluminated.

In the exemplary embodiment in FIG. 1, four lighting elements 4, 5, 6, 7 are arranged in a rectangular arrangement 13 with respect to one another, wherein two upper lighting elements 4, 5 and two lower lighting elements 6, 7 are arranged spaced apart from one another. The rectangular arrangement does not have to be strictly rectangular, it can also be embodied in the manner of a parallelogram or trapezoid or square.

The lighting elements 4, 5, 6, 7 which are arranged in the rectangular arrangement with respect to one another are each arranged spaced apart from one another and each define a corner of a rectangle or of a trapezoid or of a parallelogram or of a square. They each have a planar extent which can be, for example, of rectangular or oval or even round design.

In each case two lighting elements 4, 5 and 6, 7 are connected to one another by means of a connecting web 14, 15, wherein the connecting web is oriented essentially in the horizontal direction. In this context, the connecting web 15, that is to say the lower of the two connecting webs, is oriented essentially horizontally, wherein the upper connecting web 14 is likewise oriented horizontally but has an inclination from the inner edge of the lighting device to the outer edge of the lighting device. The connecting web 14 leans as it were from the inside to the outside towards the vehicle edge and has a slight curvature. On the inside and the outside this relates here to the rear part of the vehicle.

In the exemplary embodiment in FIG. 1, the connecting webs 14 and 15 connect not only the respective lighting elements 4, 5 and 6, 7 but also they project over the lighting elements to the right and left in the lateral direction. Alternatively, the connecting webs can also end with the lighting elements or protrude beyond a lighting element only on one side.

At least one further lighting element 8, which extends transversely and is of linear design is arranged between the lighting elements 4, 5 and 6, 7. This second lighting element 8 engages between the two rows of lighting elements with the lighting elements 4, 5 and 6, 7 and extends essentially in the lateral direction in the width of the connecting webs 14 and 15.

Furthermore, a frame-like enclosure 12 is provided which surrounds the lighting field 16 of the lighting elements 4 to 7 and 8 in the form of a C, wherein the two arms 17, 18 run with a lateral orientation starting from an origin and in the process assume the form of a C. The origin lies at the outer lateral end of the lighting device 1. In this context, the arm 17 is arranged above the lighting field 16, and the arm 18 is arranged below the lighting field 16. The enclosure projects with respect to the lighting field and therefore forms a type of frame, which is, however, embodied so as to be open on one side. Alternatively, the frame element can also lie in the plane of the cover panel 3. Furthermore, a lighting element 9 is provided which is oriented perpendicularly between the two arms 17 and 18 of the enclosure 12 and connects the two arms.

Furthermore, a further lighting element 10, which is oriented in a planar fashion, such as in the manner of a rectangle or parallelogram or trapezoid, is provided inside the arm 18.

In the exemplary embodiment in FIG. 1, the enclosure 12 can be illuminated, wherein lighting elements 11 are provided inside the arms or behind the arms in order to illuminate the arms.

It is particularly advantageous if the lighting elements 11 of the enclosure are embodied as a tail light of the vehicle. In this context it is advantageous if the lighting elements 4, 5 and 6, 7 serve as brake lights, wherein the connecting webs 14, 15 are alternatively illuminated or unilluminated, so that in the illuminated exemplary embodiment the connecting webs also contribute to the brake light. The lighting element 8 is preferably embodied as a travel direction indicator such as a flashing indicator light. The lighting element 9 can be used as a reversing light, and the lighting device 10 can be used as a rear fog light. Alternatively, the lighting elements 4 to 7 serve as tail lights, or as brake lights and tail lights in combination.

Figure 2:
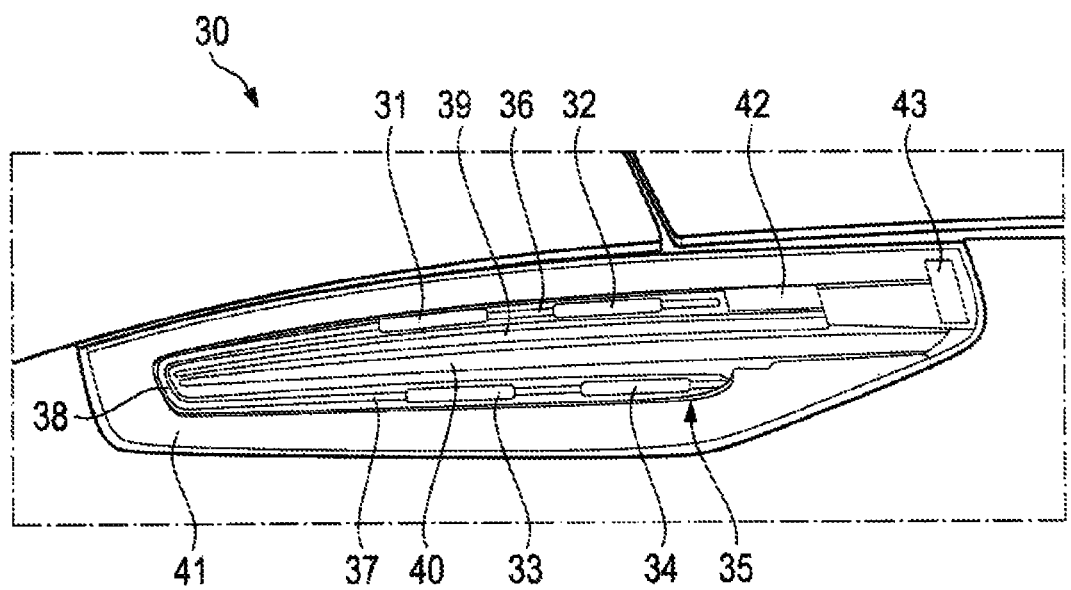
FIG. 2 shows a schematic illustration of an alternative lighting device.

FIG. 2 shows an alternative configuration of a lighting device 30 in which in turn four lighting elements 31 to 34 are arranged in a rectangular arrangement with respect to one another.

The lighting elements 31 and 32 and the lighting elements 33 and 34 are each connected to one another in pairs by means of a connecting web 36, 37, wherein both connecting webs 36, 37 extend in the lateral direction and are oriented essentially horizontally. The two connecting webs 36, 37 form a connection 38 on the outer side with the result that the connecting web 36 is formed with the connecting web 37 as a web which is embodied in the form of a C.

Arranged between the lighting elements 31 to 34 are two lighting elements 39 and 40 which extend laterally and linearly essentially in the horizontal direction, wherein the two lighting elements 39 and 40 are oriented essentially parallel with one another and essentially adjacent to one another.

Furthermore, an enclosure 41 is provided which surrounds the lighting elements in the form of a C. Furthermore, two lighting elements 42 and 43 are provided, wherein the lighting element 42 is arranged as a lateral extension of the connecting web 36, and the lighting element 43 is in turn arranged as a lateral extension with respect to the latter, wherein, however, the lighting element 43 is oriented in the vertical direction and the lighting element 42 in the horizontal direction.

In the exemplary embodiment in FIG. 2, the lighting elements 31 to 34 are preferably embodied as brake lights, the lighting elements 39 and 40 embodied as a tail light and as a flashing indicator light, and the lighting elements 42 and 43 as a reversing light or as a rear fog light. In the exemplary embodiment in FIG. 2, the enclosure 41 can be illuminated or alternatively also unilluminated. The enclosure can therefore be illuminated and, for example, act as a light as part of the tail light.

Figure 3:
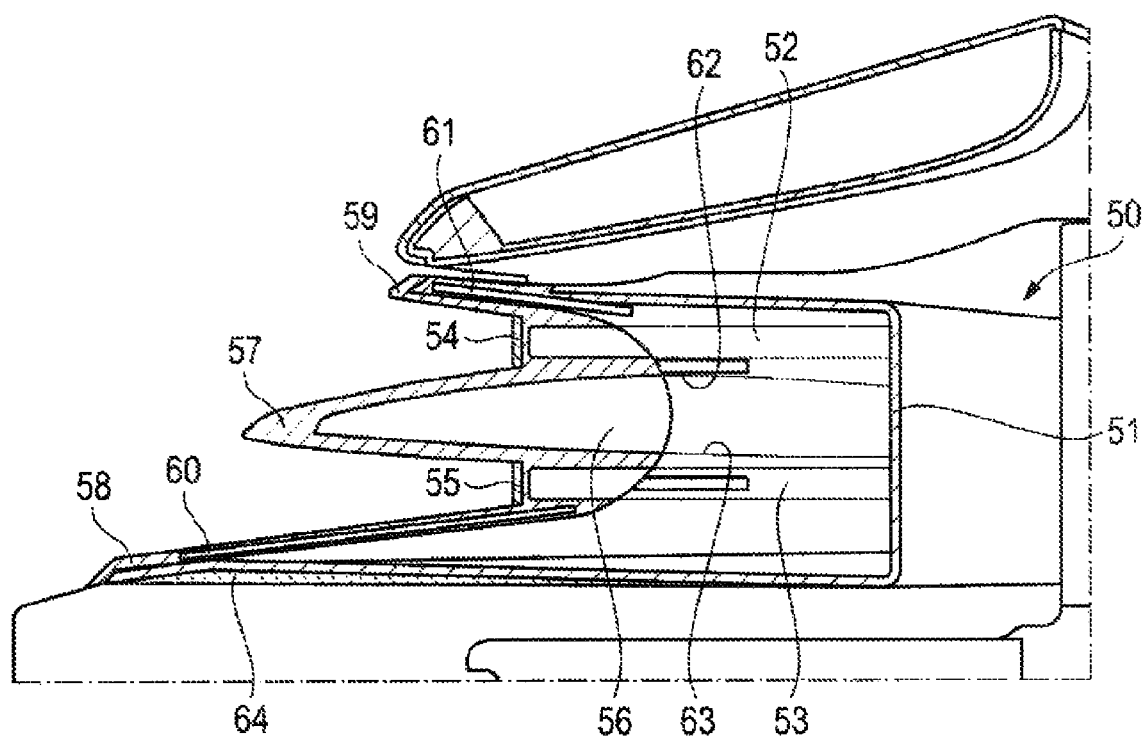
FIG. 3 shows a section through a lighting device.

FIG. 3 shows the lighting device 50 in section, wherein the housing 51 is provided with a surrounding wall. Within the housing 51 individual sections are provided in which lighting devices are arranged. These sections are advantageously arranged horizontally one on top of the other.

The two lighting elements 4, 5 and 31, 32 are therefore arranged, for example in the section 52, with the relevant connecting webs 14 and 36, respectively. In the section 53, the lighting elements 6, 7 and 33, 34 are arranged with the respective connecting webs 15 and 37, respectively. Cover panels 54, 55 are arranged at the rear end of the sections 52 and 53. A section 56, which accommodates lighting elements such as, for example, the lighting element 8 or the lighting elements 39, 40, is provided between the two sections 52 and 53. In the rear direction, the section 56 is closed off by the outer lens 57 which is directed with a triangular contour toward the rear part of the vehicle.

Lighting elements 60, 61 can be arranged inside the enclosure 58, 59 in order to be able to illuminate the enclosure, so as to be able to implement, for example, a tail light function. Furthermore, circuit boards or printed circuit boards are shown which serve to actuate the lighting elements electronically. The printed circuit boards for the sections 52 and 53 are denoted by 62 and 63.

Likewise, thermal insulation 64 can be seen which is arranged underneath the housing and provides thermal protection for the lighting unit in the event of hot components of the vehicle, such as, for example, the internal combustion engine, being arranged underneath the lighting unit.

Figure 4:
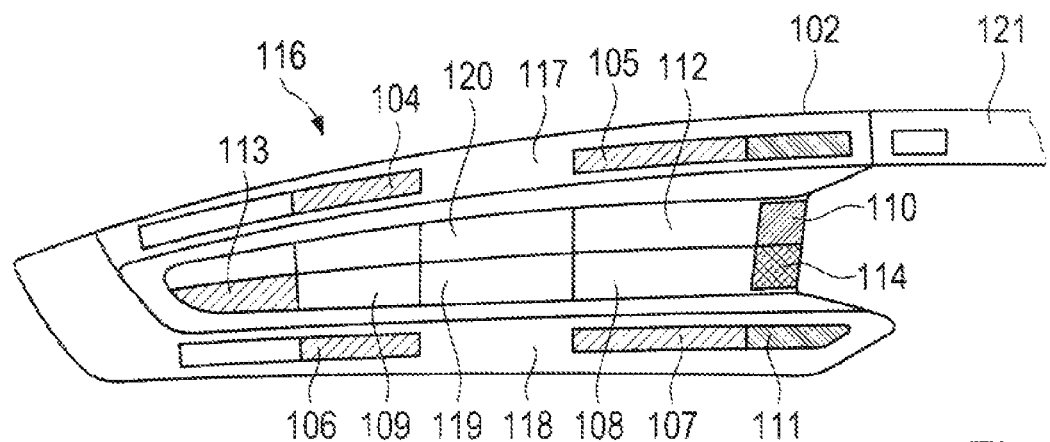
FIG. 4 shows a schematic illustration of a further exemplary embodiment of a lighting device.
Figure 6:
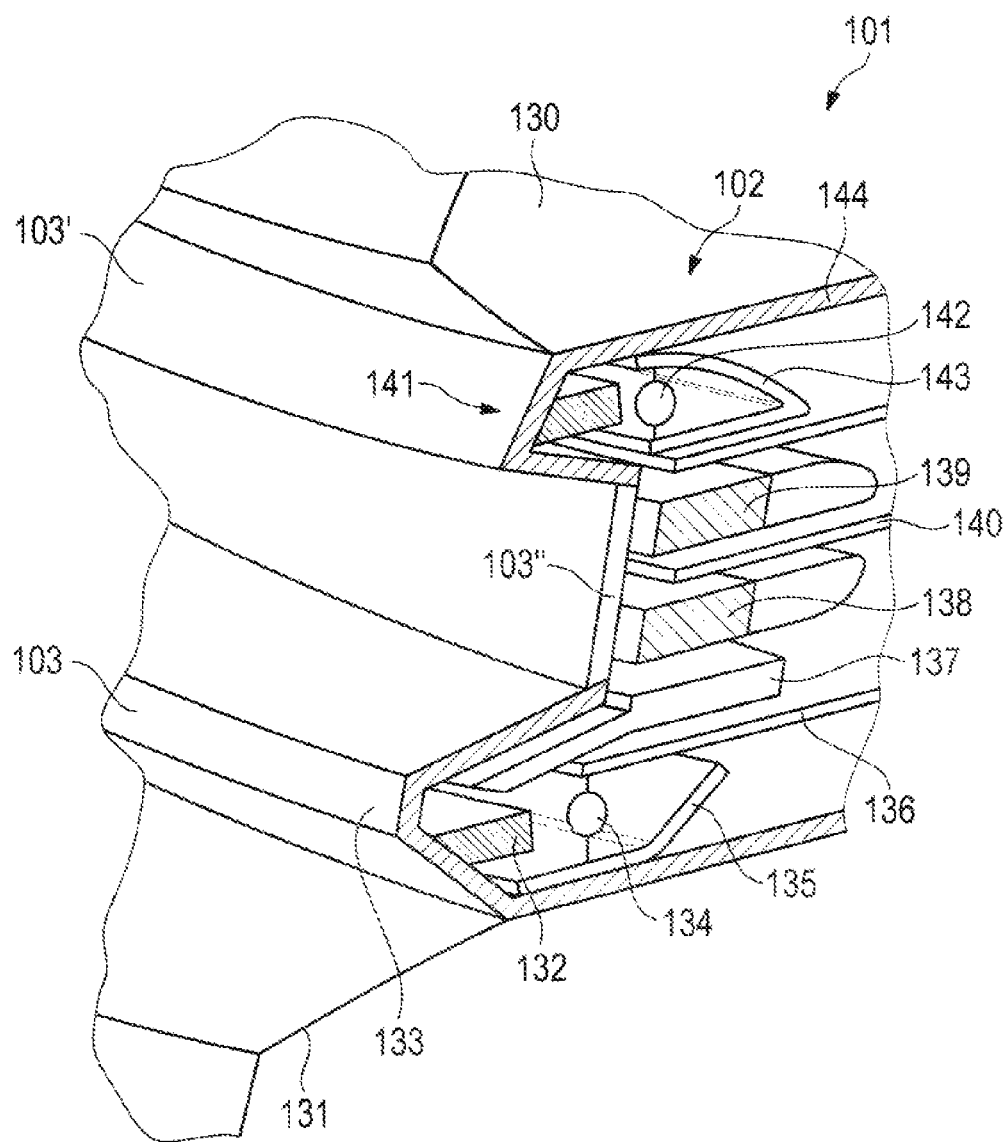
FIG. 6 shows a three-dimensional view with a section through the lighting device.

FIGS. 4 and 6 show a further exemplary embodiment of a lighting device 101 in an arrangement in a rear part of a motor vehicle. The lighting device 101 has a housing 102 in which a multiplicity of lighting elements are arranged, in order to form different lighting units. Here it is possible to form, for example, a tail light, a flashing indicator light, a brake light, a rear fog light and/or a reversing light or some other light.

In the exemplary embodiment in FIGS. 4 and 6, the housing 102 is covered with at least one cover panel 103, 103', 103" at the rear end region of the motor vehicle. The lighting elements 104, 105, 106, 107, 108, 109, 110, 111, 112, 113, 114 are arranged distributed in the housing 102.

In the exemplary embodiment in FIGS. 4 and 6, four lighting elements 104, 105, 106, 107 are arranged in an essentially rectangular arrangement 116 with respect to one another, wherein two upper lighting elements 104, 105 and two lower lighting elements 106, 107 are arranged spaced apart from one another. However, the rectangular arrangement 116 does not necessarily have to be rectangular, it can also be embodied in the manner of a parallelogram, or trapezoid or square.

The lighting elements 104, 105, 106, 107 which are arranged in the rectangular arrangement 116 with respect to one another are each arranged spaced apart from one another and each define a corner of a rectangle or of a trapezoid or of a parallelogram or a square. They each have a planar extent which can be embodied, for example, essentially in a rectangular or oval or even round fashion.

Arranged between the lighting elements 104, 105 and 106, 107 is at least one further lighting element 108, 109, 113, 114, 110, 112 which extends transversely or vertically and is embodied essentially in a rectangular or linear fashion. These lighting elements 108, 109, 112, 113 engage between the two rows of lighting elements with the lighting elements 104 and 105 as well as 106 and 107 and extend essentially in the lateral direction. The lighting elements 108 and 112 are arranged between the two lighting elements 105 and 107, wherein the lighting element 109 is arranged between the two lighting elements 104, 106.

A further lighting element 111 is arranged at the level of the lighting element 107 and adjacent thereto.

In this context it is advantageous if the lighting elements 104, 105 and 106, 107 serve as brake lights. The lighting element 108 is preferably embodied as a travel direction indicator such as a flashing indicator light. The lighting element 110 and/or 109 can be used as reversing lights, and the lighting element 111, 113 and/or 114 can be used as rear fog lights. The lighting elements 117 and 118 and, if appropriate, the region 119, 120 therebetween can be used as tail lights.

A cover 121, which extends between two lighting devices 101, which are arranged on the two rear sides of the vehicle, can be provided adjacent to the lighting device 101.

Figure 5:
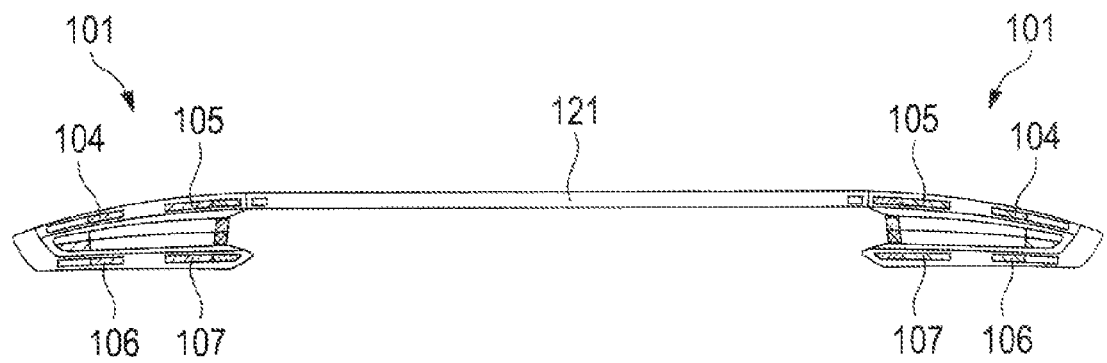
FIG. 5 shows a schematic illustration of two lighting devices with a cover between the lighting devices.

FIG. 5 shows the arrangement of the cover 121 between two lighting devices 101, such as can be arranged on the right and left at the rear part of a motor vehicle.

FIG. 6 shows a lighting device 101 in section, wherein the lighting device 101 is surrounded by a side part or rear spoiler 130 or some other vehicle bodywork component 131.

Covers and/or optical elements 132, which are covered by a red lens 133, are provided at the level of the lighting elements 104, 105, 106, 107. A lightguide 134 is arranged behind the latter, and arranged behind said lightguide 134 is a reflector 135 which is advantageously metalized in a mirrored fashion. Arranged above the lightguide is a printed circuit board 136 which holds and actuates lighting means, preferably for feeding light into the lightguide or lightguides 134.

A cover 137, which is preferably metalized on both sides, is also provided above the printed circuit board 136.

A lightguide block 138 is arranged in the region of the lighting elements 113, 109, 108, 114, wherein a further lightguide block 139 is provided above the latter in the region of the lighting elements 112, 120, 110. In the lateral direction, the lightguide blocks are preferably embodied separately, with the result that the lighting elements 113, 109, 108, 114 and 112, 120, 118 can be actuated and illuminated separately.

Provided between the two lightguide blocks 138 and 139 is a printed circuit board 140 with a dividing rib for, firstly, supplying the two lightguide blocks with light since lighting means, such as LEDs, are provided on the printed circuit board for feeding light into the lightguide blocks 138, 139.

Provided above the two lightguide blocks 138, 139 at the level of the lighting elements 104, 105, 117 is a lightguide 142 behind the red lens 141, wherein a metalized reflector 143 is arranged behind the lightguide.

The housing 144 terminates above the lightguide. The housing is preferably embodied in a color, such as red.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A lighting device for a rear part of a vehicle, the lighting device comprising:
   a housing;
   at least one cover panel covering the housing;
   a plurality of lighting elements disposed in the housing and forming different lighting units, wherein four of the lighting elements are arranged in a rectangular arrangement with respect to one another so as to form a first lighting unit, the four lighting elements of the first lighting unit including two upper lighting elements disposed adjacent to one another and two lower lighting elements disposed adjacent to one another, wherein the two upper lighting elements are connected to one another by a first connecting web that extends at least from a first of the upper lighting elements to a second of the upper lighting elements and the two lower lighting elements are connected to one another by a second connecting web that extends at least from a first of the lower lighting elements to a second of the lower lighting elements, each of the first and. second connecting webs being configured to be illuminated so as to contribute to the light emitted by the first lighting unit, the two connecting webs being connected to one another in an arcuate shape; and
   at least one transversely extending second lighting element having an elongated design arranged between the two upper and the two lower lighting elements.

2. The lighting device as recited in claim 1, wherein the lighting elements include light emitting diodes.

3. The lighting device as recited in claim 1, wherein the first and second connecting webs are oriented essentially horizontally or inclined with respect to the horizontal, and in each case the respective first and second lighting elements are arranged essentially horizontally at the same height or are arranged offset in relation to one another with respect to the height.

4. The lighting device as recited in claim 3, wherein one of the two upper lighting elements or two lower lighting elements are arranged horizontally essentially at the same height as one another, and the other of the two upper lighting elements or two lower lighting elements are arranged offset in relation to one another with respect to height.

5. The lighting device, as recited in claim 3, wherein the upper two lighting elements are arranged offset in relation to one another with respect to height and the lower two lighting elements are also arranged offset in relation to one another with respect to height.

6. The lighting device as recited in claim 1, wherein at least one third lighting element that has an elongated design and extends transversely is arranged between the two upper and the two lower lighting elements, said third lighting element being arranged adjacent to the second lighting element.

7. The lighting device as recited in claim 1, wherein the housing has a frame-like enclosure which is C-shaped and extends transversely, wherein one arm is arranged above and one arm is arranged below the four lighting elements of the first lighting unit.

8. The lighting device as recited in claim 7, Wherein the at least one cover panel includes a first cover panel and the frame-like enclosure projects outward with respect to the first cover panel, the first cover panel being positioned so as to cover the four lighting elements of the first lighting unit, or the frame-like enclosure is arranged essentially at the same level as the first cover panel.

9. The lighting device as recited in claim 6, wherein the at least one cover panel includes a first cover panel that is provided for covering at least one of the transversely extending linear second or third lighting elements, wherein the first cover panel projects outward with respect to a second cover panel that covers the four lighting elements of the first lighting unit or the first cover panel is arranged at the same level as the second cover panel.

10. The lighting device as recited in claim 7, wherein the flame-like enclosure is embodied in an illuminated or illuminating form.

11. The lighting device as recited in claim 1, wherein the connecting webs are narrower than the lighting elements.

12. The lighting device as recited in claim 1, wherein the connecting webs do not cover the lighting elements.

13. The lighting device as recited in claim 1, wherein the lighting elements of the first lighting unit and the connecting webs are arranged on a common arcuate printed circuit board.

14. The lighting device as recited in claim 1, wherein the first connecting web extends from the second of the upper lighting elements and the second connecting web extends from the second of the lower lighting elements into a connection section so as to provide the arcuate-shaped connection. between the two connecting webs and form a C-shaped web.

* * * * *